S. M. Young,
Scroll Sawing Mach.
No. 111,895.  Patented Feb. 14, 1871.
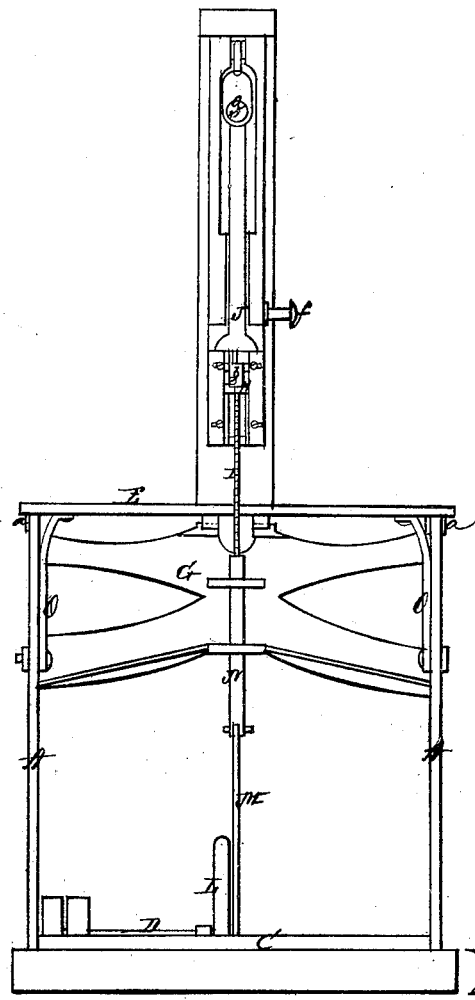
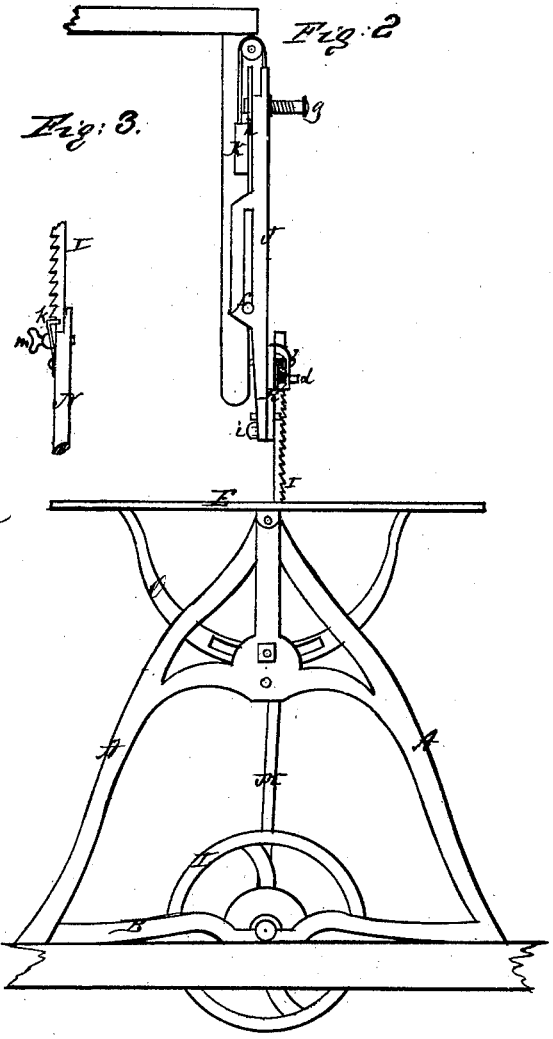
Witnesses
C. L. Evert
A. M. Mars
Inventor
Samuel M. Young
per
Alexander Mason
Attys.

United States Patent Office.

SAMUEL MANSKER YOUNG, OF JACKSONVILLE, ILLINOIS.

Letters Patent No. 111,895, dated February 14, 1871; antedated February 2, 1871.

IMPROVEMENT IN SCROLL-SAWING MACHINES.

The Schedule referred to in these Letters Patent and making part of the same.

*To whom it may concern:*

Be it known that I, SAMUEL MANSKER YOUNG, of Jacksonville, in the county of Morgan and in the State of Illinois, have invented certain new and useful Improvements in Scroll-sawing Machines; and do hereby declare that the following is a full, clear, and exact description thereof, reference being had to the accompanying drawing and to the letters of reference marked thereon, making a part of this specification.

The nature of my invention consists in the construction and arrangement of a "scroll-sawing machine," as will be hereinafter fully set forth.

In order to enable others skilled in the art to which my invention appertains to make and use the same, I will now proceed to describe its construction and operation, referring to the annexed drawing, in which—

Figure 1 is a front view, and

Figure 2 is a side view of my machine.

Figure 3 is a side view of the bottom saw connection.

The frame supporting the saw-table of my machine is constructed in the following manner:

A A represent the two legs of each side of the frame, said legs being curved, as shown in fig. 2, and come together in the center at their upper ends, while their lower ends are separated a suitable distance, and connected by a bottom rail, B.

The two sides of the frame thus formed are connected by rails C at the lower ends of the legs.

There is also a center rail, of the same shape, as and parallel with the side rails B B, to support the fly-wheel shaft D immediately under the saw.

On the bottom of these rails, in the center, is a flange, as seen in fig. 2, to bolt the frame firmly to the floor or foundation.

The point where the legs A A join together is connected by a cast-hinge, a, made fast to the table-top E, and a center piece, G, connecting the two sides of the frame is also connected with the table-top with cast hinges just back of the saw, to give solidity to that part of the table-top.

H is a slide attachment, provided with a clamp, b, which is adjusted to the edge of the saw I, between the teeth, or otherwise, by a screw, d, or spring, giving solidity and strength to the saw, and preventing the heating of the saw, and also enables it to cut heavy lumber equal to a sash-saw.

Thus this saw is designed to do the work of either muley or sash-saw, and save the expense of the sash-saw altogether.

The slide H will be made light, of steel or cast, the face to be oval, and a mark or cut to hold the back of the saw.

This cut for the back of the saw is made oval, to give ease to the saw in making the stroke.

The clamp fastening, b, between the saw-teeth, has a notch in it to fit on the edge of the saw-blade, to hold it square and firm, and a spring, e, under the same, to free the saw from it upon a slack of thumb-screw d.

The head J, in which the slide H moves up and down, is to be balanced by a weight, K, as shown, so that it will be easily set to any point, and is made fast by the clamp-screw f.

The top of the head J is provided with a temper-screw, g, which has a groove near its point, and works in the plate h.

This screw governs the rake of the saw. By a turn the top of the saw is inclined backward or forward.

At the bottom of the head E is an eccentric roller or dog, i, to hold down the lumber.

The roller cuts on bottom so it will not slip in case the wood is jerked upward against it.

The frame-work, in which the head J is adjusted, may be arranged in any desired manner.

From the fly-wheel L, on the shaft D, a pitman, M, imparts an up-and-down motion to a rod or bar, N, moving in guides on the cross-bar G.

On the upper end of this rod or bar is a spring hook, k, which catches in the edge or front of the saw, at its lower end, and clamps it back against an oval bearing with a slight cut to receive the back of the saw, thus giving the blade an easy bearing, so that it may give to the rake or motion of the saw.

This holds the blade firm by the front edge just where it does the cutting, while the back has room to play.

The spring-hook k is fastened by a thumb-screw, m.

On the under side of the table E are semicircular arms O O, which are slotted, as shown in fig. 2, and secured to the sides of the frame A B by bolts passing through said slots.

The table-top E may thus be turned on its hinges so as to incline either backward or forward, as may be desired.

It will be observed that the entire lower machinery is within the table support, without depending upon other frame-work for a part of its support.

Thus the machinery may be easily kept in line, and is also easily moved and set up in any part of the shop, by unbolting the frame from the floor or foundation.

Having thus fully described my invention,

What I claim as new, and desire to secure by Letters Patent, is—

1. The slide H, constructed as described, and provided with clamp b, thumb-screw d, and spring e, substantially as and for the purposes herein set forth.

2. The head J, secured at any height desired by thumb-screw f, and its inclination adjusted by temper-screw g, substantially as and for the purposes herein set forth.

3. In combination with the head J, constructed and adjusted as described, the eccentric roller or dog i, constructed and operating substantially as and for the purposes herein set forth.

4. In combination with the saw I, and its upper bearing, formed on the slide H, the bar N, spring-hook k, and set-screw m, constructed and arranged to operate substantially as and for the purposes herein set forth.

In testimony that I claim the foregoing I have hereunto set my hand this 24th day of May, 1870.

SAMUEL MANSKER YOUNG.

Witnesses:
MARTIN VOGEL,
JOHN D. M. CONRAD.